July 23, 1957 J. C. KNOP ET AL 2,799,921
TRAILER COUPLING AND METHOD OF PRODUCING SAME
Filed Nov. 2, 1954
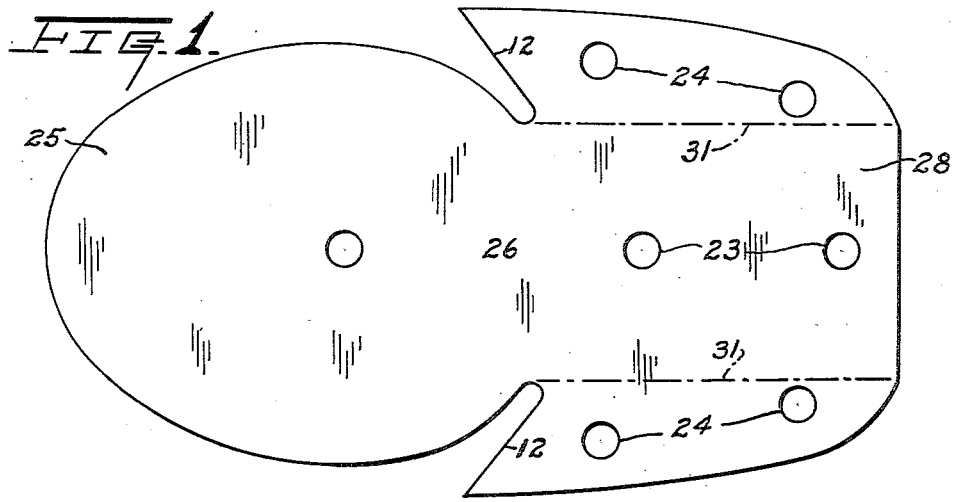
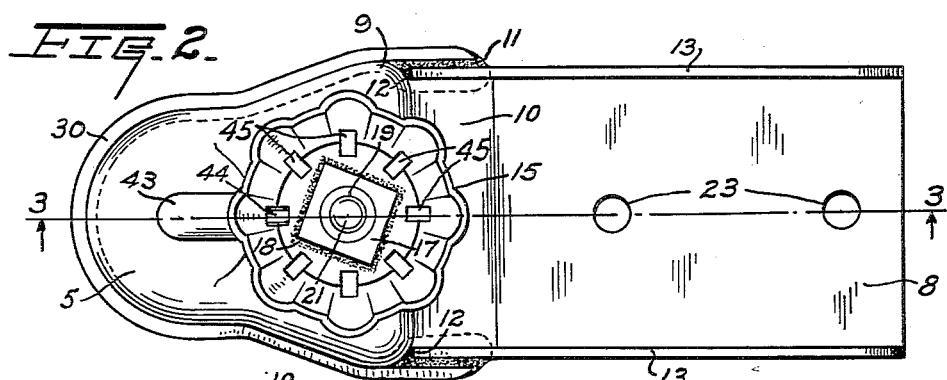
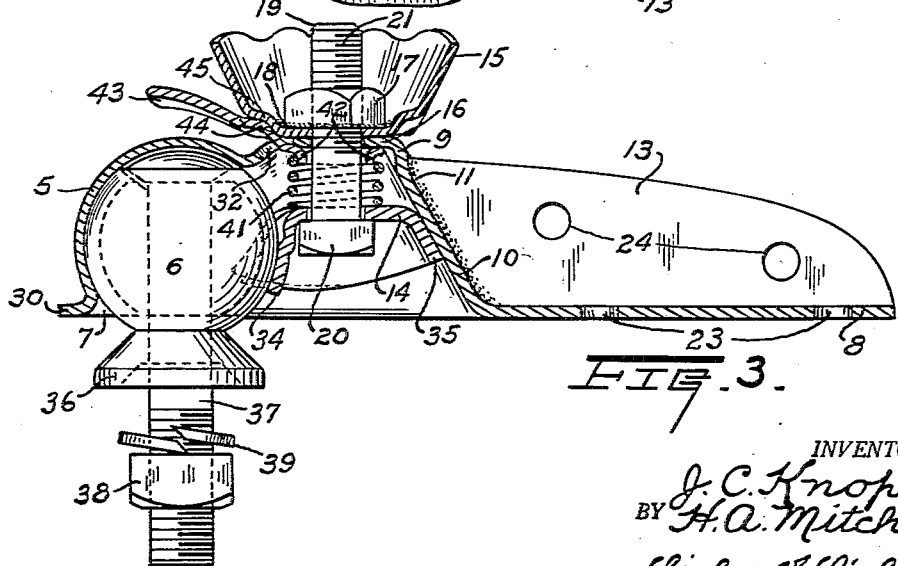
INVENTORS
J. C. Knop
BY H. A. Mitchell
Lieber & Lieber
ATTORNEYS

United States Patent Office 2,799,921
Patented July 23, 1957

2,799,921

TRAILER COUPLING AND METHOD OF PRODUCING SAME

James C. Knop, West Allis, and Harry A. Mitchell, Mukwonago, Wis., assignors to The Fulton Company, West Allis, Wis., a corporation of Wisconsin Application November 2, 1954, Serial No. 466,422

1 Claim. (Cl. 29—536)

The present invention relates in general to improvements in the art of manufacturing ball type trailer couplings, and relates more specifically to improvements in the construction of the socket and ball retaining and adjusting elements of such couplings and to an improved method of fabricating these parts.

The primary object of this invention is to provide improvements in the construction of sheet-metal trailer coupling parts whereby simple and inexpensive but exceedingly durable universal couplings result.

It has heretofore been common practice to utilize automobile trailer couplings, each consisting of a ball member secured to the draft vehicle and coacting with a socket member carried by the trailer, the ball member normally being releasably retained within the socket member by a clamp adapted to be adjusted with the aid of a hand wheel coacting with a bolt. In some instances these prior couplings were also more accurately and durably constructed primarily of sheet-metal with the aid of punches and dies, and while the previous sheet-metal ball members and retaining clamps were quite satisfactory, the prior sheet metal socket members and the sheet-metal hand wheel assemblages were not.

The socket member of such a universal coupling embodies a spherical socket which must be formed for rather snug coaction with the ball member, and an attaching or mounting plate provided with upright opposite side walls and extending away from the socket and between which and the ball the releasable clamp is located. The mounting plate of the socket member is preferably located in the plane of the lower socket opening through which the ball is insertible, and the socket is also preferably provided with integral continuous opposite side walls and with a rear inclined reaction wall for the ball clamp, all of which walls must be rigidly and firmly connected with the draft plate either by forming the interconnected parts integral with each other or by welding them together. In the prior sheet-metal socket members they were formed of a single blank, but several welds were required on each of the opposite sides of each member between the socket and the inclined reaction wall and between this inclined wall and the adjacent side walls of the mounting. This method of fabrication not only required the use of an excessive number of unsightly welds on the exterior of the socket member, but also introduced weakness in the member if the welds were not all perfect.

The prior sheet-metal trailer couplings above referred to, and wherein a clamping bolt was interposed between a sheet-metal retainer plate or clamp and a sheet-metal hand wheel, also required the use of a loose nut cooperating with the bolt. This nut even when utilized in conjunction with a lock washer, was subject to dropping off during normal use of the coupling and loss at all times, thereby introducing considerable danger and annoyance.

It is therefore a more specific object of the present invention to provide an improved socket member for a sheet-metal ball and socket trailer coupling which obviates all of the objectionable features of the prior sheet-metal members and which is infinitely stronger and safer than similar coupling members formed of castings.

Another important object of this invention is to provide an improved sheet-metal hand wheel and ball clamping assemblage for such trailer couplings, wherein danger of loosening and loss of the clamping nut is positively eliminated.

A further important object of the invention is to provide improved methods of fabricating various parts of sheet-metal ball and socket vehicle trailer couplings in an expeditious manner and at minimum cost to produce exceptionally strong and durable highly aesthetic final assemblages.

These and other more specific objects and advantages of the invention will be apparent from the following detailed description.

A clear conception of the steps involved in the improved methods of fabrication, and of the construction and operation of a typical ball and socket trailer coupling resulting from the exploitation of such methods, may be had by referring to the drawing accompanying and forming a part of this specification and wherein like reference characters designate the same or similar parts in the various views.

Fig. 1 is a plan view of a one-piece sheet-metal blank such as employed in the production of the improved unitary socket member of a commercial ball and socket trailer coupling;

Fig. 2 is a slightly enlarged top view of a complete coupling embodying the present improved sheet-metal socket member and clamp manipulating hand wheel; and Fig. 3 is a similarly enlarged central longitudinal section through the coupling assemblage of Fig. 2 taken along the line 2—2, and also showing the ball member of the unit in elevation.

While the invention has been shown and described herein as being especially advantageously applicable to automobile trailer couplings of relatively small size but of tremendous strength, it is not the intent to unnecessarily restrict the use of the improvements by virtue of this limited embodiment; and it is also contemplated that specific descriptive terms employed herein be given the broadest possible interpretation consistent with the actual disclosure.

Referring to the drawing, the improved ball and socket trailer coupling illustrated in Figs. 2 and 3, comprises in general, a sheet-metal socket member having a spherical downwardly open socket 5 at one end adapted for the reception of a ball member 6 through the lower socket opening 7, and also having a horizontal attaching or mounting plate 8 at its opposite end disposed in the plane of the opening 7 and which is connected to the top of the socket 5 by a continuous web 9 the medial wall portion 10 of which slopes upwardly and forwardly away from plate and the opposite enclosed sides of which are externally connected by welds 11 to the front inclined edges 12 of upstanding side walls 13 of the plate 8; a sheet-metal ball clamp or retainer plate 14 for normally confining the ball member 6 within the socket 5; a sheet-metal cup-shaped hand wheel 15 coacting with the top 16 of the socket member and having a nut 17 permanently attached thereto by a weld 18; and an upstanding bolt 19 having a head 20 coacting with the retainer plate 14 while its threaded end 21 coacts with the nut 17.

The mode of manufacturing the sheet-metal socket member with the aid of simple punches and dies so as to produce such members of maximum strength and with minimum labor, is unique, and involves the following procedure. A unitary flat sheet-metal blank such as shown in Fig. 1, and having one elliptical end portion 25 and an opposite dove-tailed shaped portion 28 formed integral with the end portion 25 by an intervening portion 26 and which is provided with the opposite inclined edges 12 adjacent to the elliptical blank portion 25, is cut with the aid of punches and dies from a sheet of steel. During this cutting operation the dove-tailed portion of the blank may also have a series of holes 23, 24 punched therein, and which subsequently provide openings for attaching the socket member to a trailer tongue.

After the blank has been thus produced, it is placed in a die and the portions 25, 26 are distorted to simultaneously form the socket 5 and its top 16 together with the inclined wall 10 all of which are interconnected by the continuous connecting web 9 formed integral therewith, and the lower edge of which web is reinforced by an integral outwardly projecting flange 30. This distortion of the blank produces a smooth and accurately formed spherical zone surface within the socket 5, and also provides a smooth inclined inner surface upon the sloping wall 10, while the top 16 of the distorted blank is plane. When the socket 5 and wall 10 have been thus formed, the mounting plate 8 may be bent upwardly along dotted lines 31 as shown in Fig. 1, to form the opposite side walls 13 and to position the inclined edges 12 close to the uninterrupted opposite sides of the web 9 whereupon the welds 11 may be applied to finally firmly unite the web 9 and side walls 13. The top 16 may thereafter be provided with a central opening for the bolt 19 and with another opening 32 the function of which will be explained later.

The sheet-metal ball clamp and retainer plate 14 may also be formed of durable sheet-metal with the aid of punches and dies, and has an integral depending front wall 34 provided with a spherical zone surface cooperable with the ball member 6, and also has an integral depending inclined rear wall 35 adapted to coact with the front surface of the wall portion 10, see Fig. 3. The ball member 6 which may likewise be formed primarily of heavy sheetmetal, comprises the sphere which is snugly but universally movably cooperable with the spherical zone surfaces of the socket 5 and plate wall 34, a base 36, and an attaching bolt 37 provided with a clamping nut 38 and a lock washer 39 for clamping the member 6 to an automobile frame or bumper. It is essential that the sphere of the ball member snugly and properly coact with the socket and retainer surfaces, and the use of sheet-metal in the formation of these elements insures such accurate coaction without machining the coacting surfaces after they have been formed with properly constructed dies.

The sheet-metal cup-shaped hand wheel 15 for selectively positioning the ball retainer plate 14 is also of improved construction, as shown in Figs. 2 and 3, and may be rapidly and accurately formed with the aid of punches and dies. The bottom of this cup-shaped hand wheel 15 has the nut 17 firmly and permanently attached centrally therein by the weld 18 so that this nut 17 cannot become detached and lost and it may be adjusted relative to the threaded bolt end 21 so as to raise or lower the retainer plate 14. The brim of the cup-shaped hand wheel 15 may be serrated as shown for easy gripping and a helical compression spring 41 which surrounds the medial portion of the bolt 19 coacts with the top of the retainer plate 14 and with the lower surface of the socket member top 16 through an annular seat 42 formed on a latch lever 43 so as to constantly resiliently urge the retainer plate wall 34 against the ball member 6 and to likewise urge the hand wheel bottom against the top 16 of the socket member.

The latch lever 43 and the spring seat 42 may also be formed of a single sheet-metal blank with the aid of punches and dies, and this lever 43 extends outwardly through the opening 32 and has an integral projection 44 latchingly cooperable with any one of an annular series of notches 45 formed in the bottom of the cup-shaped hand wheel 15. When the latch lever 43 which is constantly urged upwardly by the spring 41 is in the position shown in Fig. 3, with its projection 44 engaging one of the hand wheel notches 45, the hand wheel 15 is positively locked against rotation. However, when the latch lever 43 is manually depressed to release its latching projection 44, then the hand wheel 15 may be freely rotated to either vary the resilient clamping pressure exerted by the latch plate 14 upon the ball member 6, or to cause the spring 41 to lower this plate 14 sufficiently to permit free removal of the socket member from the ball member 6.

From the foregoing detailed description it will be apparent that the improved ball and socket trailer coupling may be expeditiously formed primarily of sheet-metal with the aid of punches and dies to produce an extremely compact and durable unit which is safely operable. The present improvement resides primarily in the formation of the socket member and hand wheel of sheet metal and in a manner whereby a minimum number of welds are required to insure the necessary strength and dependability of these parts. By forming the socket member with the continuous web 9 connecting the socket 5 with the mounting plate 8 and intervening inclined wall 10, an exceptionally strong draft member adapted to effectively resist distortion when subjected to tremendous tension is produced, and each side wall 13 of the mounting plate 8 can be attached to the adjacent portion of the uninterrupted web 9 by a single external weld 11. By providing the retainer plate 14 with front and rear depending integral walls 34, 35 maximum contact areas between the plate 14 and the ball 6 and wall 10 are obtainable, and the formation of the hand wheel 15 with the nut 17 permanently welded therein eliminates possible accidental loss of the nut and detachment of the coupling members. The improved couplings can be manufactured in various sizes at relatively low cost, and have proven highly satisfactory and successful in actual commerical use.

It should be understood that it is not desired to limit this invention to the exact details of construction and operation or to the exact method of producing the coupling units herein shown and described for various modifications within the scope of the appended claim may occur to persons skilled in the art.

We claim:

The method of fabricating the socket member of a ball and socket trailer coupling, which comprises, providing a unitary flat sheet-metal blank having an elliptical area at one end and a dovetailed area at its opposite end integrally united by an intervening portion, said dovetailed area having inclined opposite edges extending away from said intervening portion toward said elliptical area, distorting said elliptical area and said intervening portion to provide a unitary spherical socket having a lower opening disposed in the plane of and integral with said dovetailed area and to simultaneously produce an integral continuous web connecting the socket with the medial part of the dovetailed area and having an integral medial inclined wall extending forwardly from the end of said dovetailed area to the top of said socket, folding the opposite sides of said dovetailed area upwardly to position said inclined edges closely adjacent to the external surface of said continuous web, and welding each of said edges to the adjacent surface.

References Cited in the file of this patent

UNITED STATES PATENTS

| | | |
|---|---|---|
| 2,189,710 | Draeger | Feb. 6, 1940 |
| 2,392,063 | Reimann | Jan. 1, 1946 |
| 2,532,676 | Shaieb | Dec. 5, 1950 |